No. 618,259. Patented Jan. 24, 1899.
W. T. WATTS & W. STORRS.
SELF ACTING MULE FOR SPINNING FIBROUS MATERIALS.
(Application filed Dec. 14, 1897.)
(No Model.) 5 Sheets—Sheet 3.

Witnesses:
B. J. Ober.
R. W. Sommers.

Inventors
William T. Watts.
William Storrs.
by Geary W.
Attorney.

THE NORRIS PETERS CO., PHOTO-LITHO., WASHINGTON, D. C.

No. 618,259. Patented Jan. 24, 1899.
W. T. WATTS & W. STORRS.
SELF ACTING MULE FOR SPINNING FIBROUS MATERIALS.
(Application filed Dec. 14, 1897.)

(No Model.) 5 Sheets—Sheet 4.

No. 618,259. Patented Jan. 24, 1899.
W. T. WATTS & W. STORRS.
SELF ACTING MULE FOR SPINNING FIBROUS MATERIALS.
(Application filed Dec. 14, 1897.)
(No Model.) 5 Sheets—Sheet 5.

UNITED STATES PATENT OFFICE.

WILLIAM THOMAS WATTS AND WILLIAM STORRS, OF STALYBRIDGE, ENGLAND.

SELF-ACTING MULE FOR SPINNING FIBROUS MATERIALS.

SPECIFICATION forming part of Letters Patent No. 618,259, dated January 24, 1899.

Application filed December 14, 1897. Serial No. 661,862. (No model.)

*To all whom it may concern:*

Be it known that we, WILLIAM THOMAS WATTS and WILLIAM STORRS, residing at Stalybridge, in the county of Chester, England, have invented certain new and useful Improvements in Self-Acting Mules for Spinning Fibrous Materials, (for which an application for Letters Patent has been made for Great Britain and Ireland, dated April 23, 1897, and numbered 10,159;) and we do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention has relation to self-acting spinning-mules; and it has for its object the provision of means whereby three different speeds can be imparted to the spindles. Two of these speeds are imparted to the spindles by well-known mechanisms by using one grooved pulley or "rim" fast on the "rim or pulley shaft" and a second pulley or rim of a different—*i. e.*, greater—diameter fast upon a sleeve of a belt-pulley, which sleeve is loose upon the rim or pulley shaft. The said belt-pulley is of the same diameter as another like pulley which is fast upon the rim-shaft, so that by moving the driving-belt from one pulley to the other one or the other of the grooved pulleys becomes alternately the driver of the spindles. These two speeds derived from the smaller and larger pulleys we will hereinafter refer to as the "intermediate" and "highest" speeds, respectively. The third speed, hereinafter to be referred to as the "slowest" speed, is derived from mechanism presently to be described and which constitutes the subject-matter of one part of our invention.

Our invention has for its further object the provision of means for driving the "drawing-out" rollers, the spindles, and the carriage in such manner that the rollers and spindles may at will be set in motion a little in advance of the carriage and to such an extent as may be deemed necessary or desirable.

Referring to the accompanying drawings.

Referring to Figs. 1 to 9, inclusive, S indicates the driving counter-shaft, which carries two belt-pulleys P and P' of the required or desired different diameter, the driving-belt B on the smaller pulley P working on pulleys $c$ $c'$ and the belt B' on larger pulley P' working on pulleys $b^4$ $b^3$ $b^2$, arranged on the rim-shaft $a$, as will now be described. The pulley $c$ is loose on the rim-shaft $a$ and has a long hub $c^a$, upon which the pulley $c'$ is loosely mounted. The pulley $c$ is connected with said shaft to drive the same through a ratchet-wheel $c^5$, fast on the shaft, and a pawl $c^2$, pivoted on a pin $c^3$, projecting from the inner face of pulley $c$, said pin serving also as a bolt by means of which a bracket $c^4$ is secured to the said pulley-face; but when the rim-shaft $a$ is driven at an increased speed (the intermediate or highest speed) the ratchet-wheel $c^5$ overruns the pawl $c^2$, which is then moved out of engagement with the ratchet-wheel through the following instrumentalities: The pawl $c^2$ has a small arm projecting from its boss or hub, to which arm is secured a pin $c^6$, and in the boss or hub of the ratchet-wheel is formed a circular groove $c^7$, in which is seated a spring-clip $c^8$, held to its seat by frictional contact. The clip has one of its branches extended to form an arm $c^9$, the outer or free end of which is forked and straddles the pin $c^6$ on the pawl.

Figure 4:
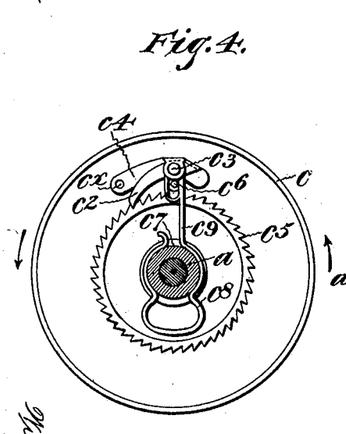
Fig. 4 is a section taken on line 2 2 of Fig. 3, looking toward the left.

When the pulley $c$ is driven in the direction of arrow, Fig. 4, to rotate the ratchet and its shaft, the pin $c^6$ is held back by the arm $c^9$ on the spring-clip, thereby oscillating the pawl, so as to move it into engagement with its ratchet. When, however, the rim-shaft is driven faster than the ratchet-wheel $c^5$, then the spring-clip $c^8$ acts to lift the pawl $c^2$ out of the teeth of said ratchet-wheel, said spring-clip slipping in its groove $c^7$ in the boss of the ratchet-wheel, the friction being just sufficient to oscillate the pawl.

The bracket $c^4$, secured to the inner face of the belt-pulley $c$ by the pivot-pin for the pawl $c^2$, carries also a stud or pin $c^\times$, that serves to limit the movement of said pawl away from its ratchet. The belt-pulley $c$ constitutes, therefore, the driver for the shaft $a$ and imparts to it its lowest speed until said shaft is driven at a greater speed.

Figure 3:
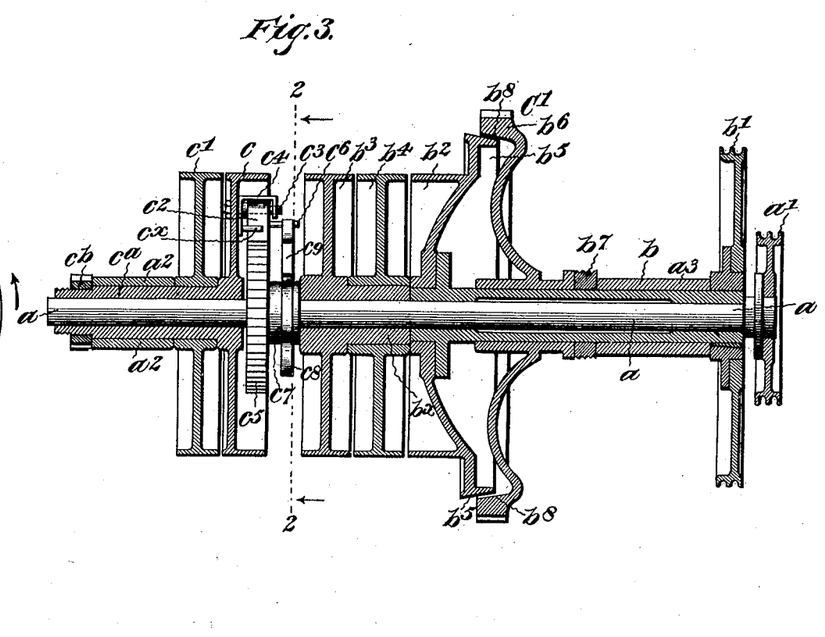
Fig. 3 is a sectional view of the belt-pulleys and other driving elements on the rim-shaft.

The rim-shaft $a$ has secured at one end a small grooved pulley $a'$ for driving the spindles in the usual manner. Near this pulley there is a similar but larger pulley $b'$ for driving the spindles in the usual manner at the highest speed. This larger pulley $b'$ is secured to a long sleeve $b$, that is loosely mounted on the rim-shaft $a$. At its opposite end said sleeve $b$ carries a combined belt-pulley $b^2$ and one half $b^5$ of a friction-clutch C′, the other half of which is formed by a spur-wheel $b^6$, that has an internal clutch-face $b^8$, which coöperates with a corresponding clutch-rim $b^5$ on the belt-pulley $b^2$, said spur-wheel being loose on the sleeve $b$. The wheel $b^6$ and clutch $b^5$ are equivalents of the means ordinarily used for driving the spindles when backing off. The wheel $b^6$ being constantly driven drives the spindles through the clutch-rim $b^5$ when backing off the thread from the spindles. On the long sleeve $b$ is also secured a worm $b^7$, commonly known as the "twist-worm," that drives the twist-shaft, to which one revolution is given for each stretch.

The rim-shaft $a$ adjoining the combined belt-pulley and half-clutch $b^2 b^5$ and between the latter and the belt-pulley $c$ carries two more belt-pulleys $b^4 b^3$, the one, $b^3$, farthest from the pulley $b^2$ being fast on said shaft, while the other, $b^4$, is loosely mounted on the boss $b^\times$ of said belt-pulley $b^3$, all of these belt-pulleys, as well as the pulleys $c$ and $c'$, being of the same diameter. It will thus be seen that the pulley $c'$ acts as a loose pulley for the driving-pulley $c$, while the pulley $b^4$ acts as a loose pulley for both the driving-pulleys $b^2$ and $b^3$.

To the end of the long boss $c^a$ of driving-pulley $c$ is secured a pinion $c^b$, that drives the front rollers, the said boss $c^a$ revolving in a bearing $a^2$ and the long sleeve $b$ in a bearing $a^3$. The two endless belts that drive the pulleys $b^2$, $b^3$, and $c$ work on pulleys on the driving counter-shaft S, Fig. 1; but the pulley on said counter-shaft for the belt that drives the pulley $c$ on the rim-shaft is smaller than that which drives the belt for the driving-pulleys $b^2 b^3$ on said rim-shaft. When pulley $c$ is driven, the small grooved pulley $a'$ on rim-shaft $a$ drives the spindles at their lowest speed, as hereinbefore stated. When the other belt drives the pulley $b^3$, fast on rim-shaft $a$, the speed thereof is increased, owing to the greater diameter of the pulley on the driving counter-shaft, and the driving-pulley $c$, though still driven, is disconnected from the rim-shaft by its increased speed, as hereinabove set forth, thereby imparting to the spindles their intermediate speed, also through the smaller grooved pulley $a'$. Finally, when the belt that drives pulley $b^3$ is shifted onto pulley $b^2$ the larger grooved pulley $b'$ will drive the spindles, thereby imparting to them their highest speed, the rim-shaft being then driven from the smaller grooved pulley $a'$, and as the belt-pulley $b^2$ and clutch $b^6$ and the larger pulley $b'$ are mounted on the long sleeve $b$, loose on said rim-shaft, and as the pulley $c$ is still uncoupled from said shaft the latter is free to rotate. It will therefore be understood that the slowest speed is imparted to the spindles through the pulleys $c\ a'$, the intermediate speed through the pulleys $b^3 a'$, and the highest speed through the pulleys $b^2 b'$.

We will now describe the belt-shifting appliances, controlled by the movements of the mule-carriage and other mechanism, whereby the slowest speed is imparted to the rim-shaft $a$ and through its pulley $a'$ to the spindles during the first part of the out movement of the mule-carriage—i. e., during the first part of the stretch—after which the medium speed is imparted to the rim-shaft $a$ and through its said pulley $a'$ to the spindles after the said first part of the stretch, and, finally, the highest speed is imparted to the spindles through the pulley $b'$ before the carriage reaches the end of the stretch, the belt being shifted onto driving-pulley $b^2$ after a fixed number of twists or turns of the spindles.

Figure 1:
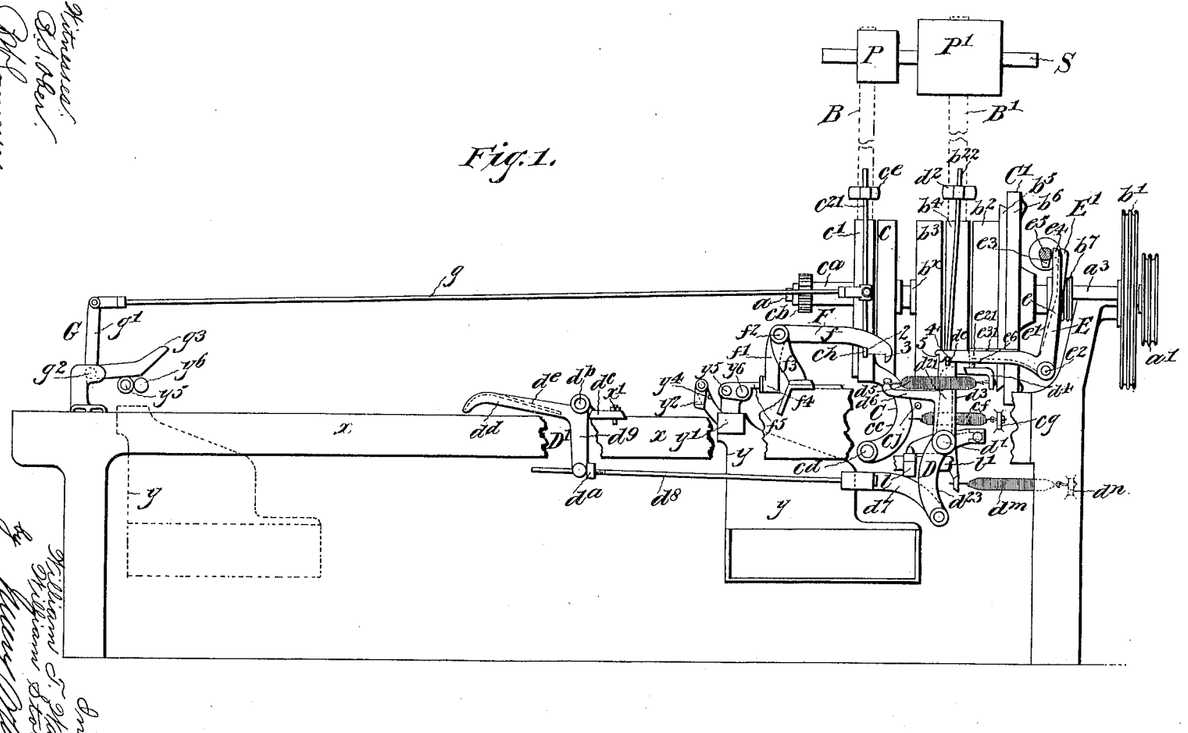
Figure 1 is a side elevation of so much of a self-acting mule as will be necessary to illustrate certain parts of our invention, the mule-carriage being indicated in full lines in the position it assumes when "in," or near the drawing-rollers, and in dotted lines when "out," or at the fullest extent of the stretch from the drawing-rollers.

The shifting-lever C comprises an arcuate arm $c^c$, and the shifting rod or bar $c^{21}$, secured thereto and carrying the forked belt-guide $c^e$ for shifting the driving-belt S, Fig. 1, from the loose pulley $c'$ to the pawl-and-ratchet-geared pulley $c$, and vice versa. The lower arcuate or segmental arm $c^c$ is fulcrumed to a stud $c^d$, Fig. 2, on the mule-framing. To the arcuate arm $d^{23}$ of the shifting-lever C is connected one end of a helical spring $c^f$, whose other end is secured to a screw-bolt adjustable in a stud $c^g$ on said mule-framing, whereby the tension of the said spring can be adjusted in a well-known manner. This spring $c^f$ when under tension acts to shift the lever C and therethrough the driving-belt from loose pulley $c'$ to fast pulley $c$; but it is prevented from doing so except at the proper time by a bell-crank lock-lever F, whose horizontal arm $f$ has two lock notches or steps 2 and 3, Fig. 2, adapted to hook upon a projection $c^h$ on said shifting-lever. The bell-crank lever F is fulcrumed at $f^2$ on a bracket $f^3$, secured to the framing, the locking or latch arm $f$ of the said bell-crank lever being lifted out of engagement with the projections $c^h$ when the carriage $y$ has gone in, at which time the nearest faller-shaft $y^6$, or preferably a projection $f^5$ from one of the brackets that carry the bearings for the faller-shafts $y^5\ y^6$, strikes the vertical arm $f'$ of the bell-crank lever F or a part $f^4$, adjustable in any desired manner, as by a set-screw, Fig. 2, on said vertical arm $f'$, so that as soon as the shifting-lever C is released from the bell-crank lever the spring $c^f$, which is then under tension, will shift said lever and the driving-belt from the loose pulley $c'$ to the fast—i. e., ratchet-and-pawl geared—pulley $c$. When in the position last described, the projection $c^h$ from said lever will lie in the notch 3 in the arm $f$ of bell-crank lever F.

To the shifting-lever C is pivoted one end of a rod $g$, whose opposite end is pivoted to the vertical arm $g'$ of a bell-crank lever G, fulcrumed at $g^2$ on a bracket at the outer or left end of the mule-framing. The horizontal arm of the bell-crank lever G has its end $g^3$ inclined upwardly, and as the carriage $y$ is about to reach the limit of its outward motion, or is nearly out at its full stretch, the outer faller-shaft $y^5$ strikes the incline $g^3$ of the horizontal arm of the bell-crank lever G, tilting the same, and thereby shifting the belt-lever $c^c$ from pulley $c$ to loose pulley $c'$. This shifting of the belt-lever also places its actuating-spring $c^f$ under tension and brings the projection $c^h$ from the lock-notch 3 back into the lock-notch 2 in the arm $f$ of bell-crank lever F to lock the shifting-lever against further motion.

Figure 2:
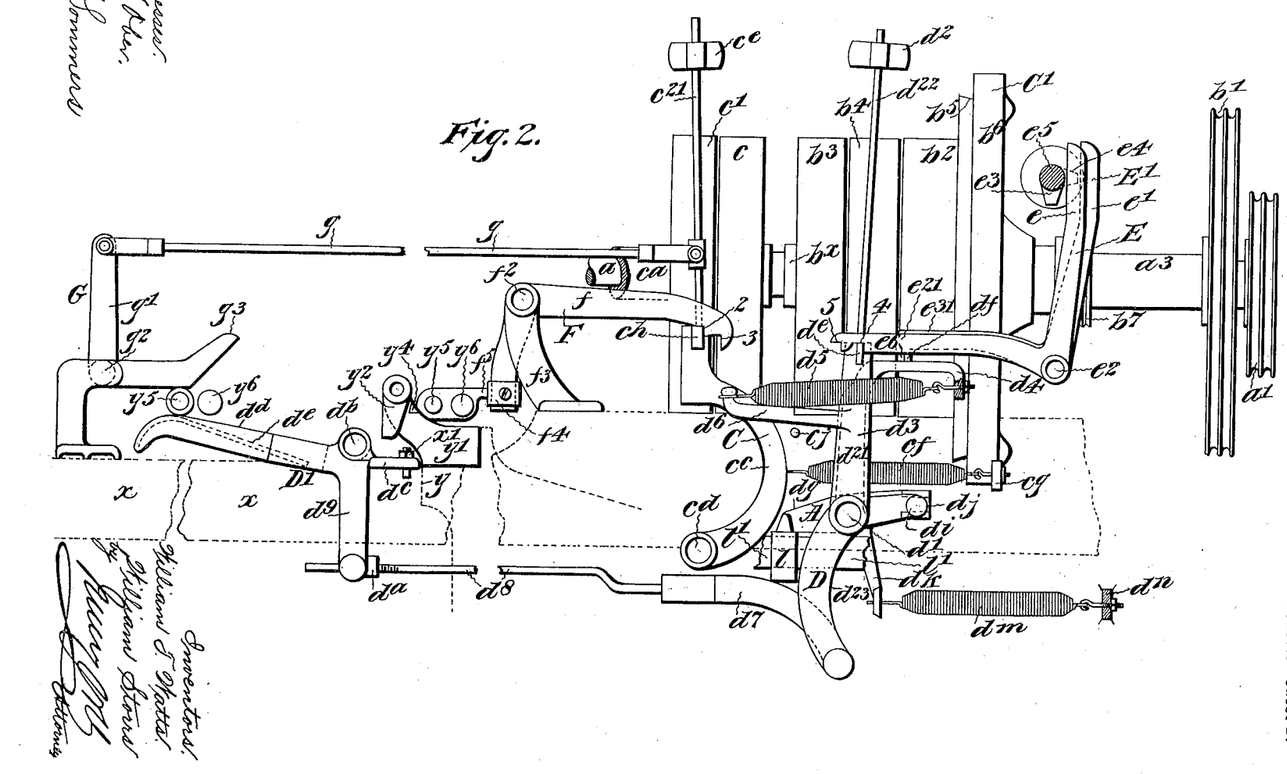
Fig. 2 is a view similar to Fig. 1, drawn to an enlarged scale, the framing shown in dotted lines being shortened by breaking away a part thereof, the carriage being likewise shown in dotted lines.

There is an abutment or stud $c^j$ projecting from the framing, Fig. 2, to stop the shifting-lever should it by accident slip away from a notch in its locking-lever F.

From what has been said it will readily be seen that the spindles are revolved at their lowest speed the moment the mule-carriage commences to move out and until the belt for the driving-belt pulley $b^3$ is shifted from loose pulley $b^4$ onto said pulley $b^3$, which takes place after the said carriage has moved a given distance out, or after the first part of the stretch.

Figures 5, 6, 7, 8, 9:
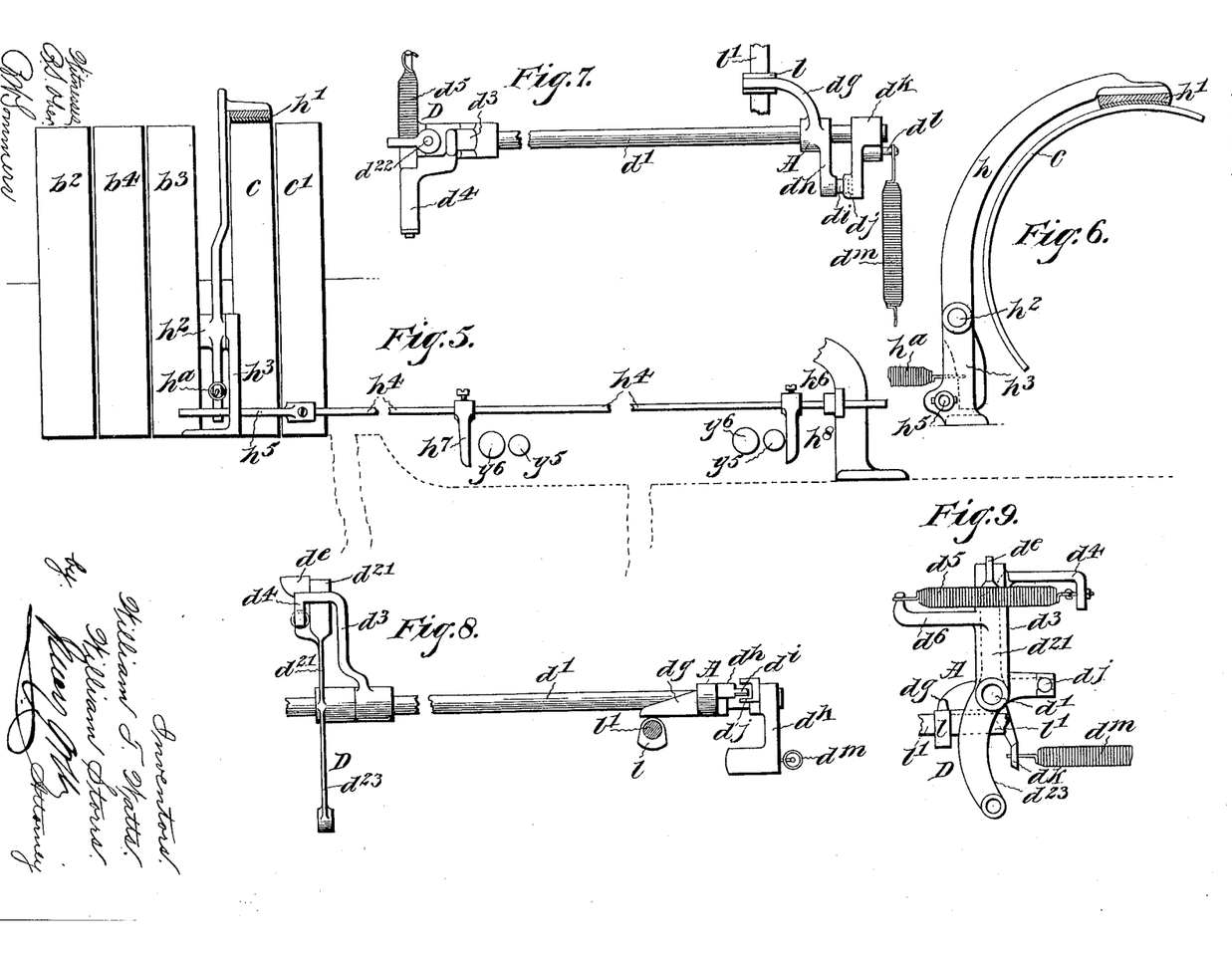
Fig. 5 is a fragmentary side elevation parallel to the plane of Fig. 1, but on the opposite side of the machine.
Fig. 6 is a detail fragmentary face view of a part of one of the driving-pulleys, showing a brake therefor.
Figs. 7, 8, and 9 are a detail plan view, a side elevation, and an end elevation, respectively, showing more clearly the mechanism for operating the belt-shifting lever for driving the spindles at the intermediate and highest speeds.

In order to brake and arrest the momentum of the driving-pulley $c$ after it is disconnected from the rim-shaft $a$ and the driving-belt shifted onto the loose pulley $c'$, as above described, we employ a friction-brake the shoe $h'$ of which is secured to an arcuate brake-lever $h$, having its fulcrum $h^2$ on a bracket $h^3$ on the framing, Figs. 5 and 6. The brake-shoe is applied to the belt-pulley by the stress of a helical spring $h^a$ acting on the short arm of the brake-lever $h$ whenever free to do so. The brake-shoe $h'$ is normally held out of contact with the driving-pulley $c$ by a wedge or inclined surface on a bar $h^5$, adjustably secured by means of a set-screw to a push-rod $h^4$, that has sliding motion in the aforesaid bracket $h^3$ and in a second bracket $h^6$. The rod $h^4$ carries two fingers $h^7\ h^8$, adjustable thereon by means of set-screws, said fingers lying in the path of the faller-shafts $y^5\ y^6$, the arrangement being such that when the carriage is about to reach the limit of its outward motion and the rod $g$ is actuated by said outer faller-shaft $y^5$ to move the shifting-lever C from the pawl-and-ratchet-geared pulley $c$ onto its loose pulley $c'$ said faller-shaft will likewise act upon the outer finger $h^8$ on rod $h^4$ and move said rod out, and thereby the inclined surface on bar $h^5$, to allow the long arm of said brake-lever to drop on said pulley $c$, thereby braking and finally arresting the momentum. The brake will thus remain applied to pulley $c$ until the carriage reaches the limit of its inward motion, or substantially so, when the inner faller-shaft $y^6$ will act upon finger $h^7$ on rod $h^4$ and draw the same back into its normal position, the inclined surface on bar $h^5$ acting on the short arm of the brake-lever $h$ to move the brake-shoe out of contact with pulley $c$.

The belt that drives pulley $b^3$, fast on rim-shaft $a$, is shifted from the loose pulley $b^4$ to said pulley $b^3$ to impart to the shaft the intermediate speed as follows: The belt-shifting lever for the driving-belt of pulleys $b^2\ b^3$ is a two-armed lever D, loosely mounted on a rock-shaft $d'$, that has its bearings in the framing. To the arm $d^{21}$ of said lever is secured the shifting-rod $d^{22}$, that carries the shifting-fork $d^2$. The other lower inwardly-curved arm $d^{23}$ of said lever D is jointed to an arm $d^7$. From the arm $d^{21}$ of lever D projects an arm $d^6$, to the upturned end of which is secured one end of a spring $d^5$, whose opposite end is adjustably connected as to tension with the downturned end $d^4$ of an angular lever $d^3$, secured to the aforesaid rock-shaft $d'$. The arm $d^7$, jointed to the arm $d^{23}$ of shifting-lever D, is connected by a rod $d^8$ with the vertical arm $d^9$ of a bell-crank lever D', the connection being an adjustable one in that the rod is screw-threaded at its outer end and carries an adjusting-nut $d^a$, Fig. 2. The fulcrum $d^b$ of bell-crank lever D' is on a bracket $d^c$, which can be adjusted lengthwise on the mule-framing $x$ by means of a hook-bolt $x'$, catching under the flange of the I-rail of frame $x$, so that the tripping bell-crank lever can be moved nearer to or farther from the drawing-rollers. The horizontal arm $d^d$ of the bell-crank lever D' has an inclined lateral projection $d^e$ in the path of a finger $y^2$, pivoted to a bracket $y'$ on the mule-carriage $y$, said finger being prevented from swinging inwardly or toward the drawing-rollers (not shown) by an abutment $y^4$; but said finger is free to swing outwardly.

The bell-crank lever $D'$ is located at a point intermediate of the limits of travel of the mule-carriage $y$, so that before said carriage reaches the limit of its outward motion or at any desired part of the stretch the finger $y^2$ will impinge upon the incline $d^e$ on arm $d^d$ of bell-crank lever $D'$, and as said finger is held against inward movement it will depress the said lever-arm $d^d$ and shift the lever $D$ and therethrough the driving-belt for the fast pulleys $b^2$ $b^3$ through the action of the rod $d^8$ on the inwardly-curved arm $d^{23}$ of said lever $D$ from the loose pulley $b^4$ to the fast pulley $b^3$. Inasmuch as this driving-pulley $b^3$ is, as hereinbefore stated, driven at a greater speed than the ratchet-and-pawl-geared belt-pulley $c$, the spindles will also be driven at a greater speed through the rim-shaft $a$ and the grooved pulley $a'$, and inasmuch as the said pulley $c$ is so geared to the rim-shaft as that it will be disconnected from said shaft by an increase in the speed thereof said pulley will cease to drive said shaft as soon as its speed of rotation is increased by the driving-pulley $b^3$. Hence the pulley $c$ will be driven idle by its belt relatively to the spindles, but will drive the rollers through the gear $c^b$, Figs. 1 and 3, until the mule-carriage $y$ nearly reaches the limit of its outward motion, or the full stretch, when the shifting-lever $C$ will be actuated to shift the belt of pulley $c$ back to loose pulley $c'$, as above described.

In view of the fact that the bracket $d^c$ is adjustable, as stated, the intermediate speed can be imparted to the shaft $a$ sooner or later during the out motion of the mule-carriage $y$. When the shifting-lever $D$ is shifted from the loose pulley $b^4$ to the fast pulley $b^3$ its retracting-spring $d^5$ is brought under tension, and said lever is held in the position to which it has been moved by means of one of two bell-crank levers $E$ and $E'$—namely, by the bell-crank lever $E$, Fig. 2—said levers being fulcrumed on a stud $e^2$, projecting from a bracket (not shown) on the framing. The horizontal arm $e^{21}$ of lever $E$ has two stop-notches 4 and 5, adapted to engage a projection $d^e$ on the arm $d^{21}$ of shifting-lever $D$, thereby holding said lever against the stress of its spring $d^5$. When in its normal position, the notch 4 engages the projection $d^e$, and when shifted to fast pulley $b^3$ the notch 5 engages said projection. The vertical arms $e$ and $e'$ of the said angle-levers $E$ and $E'$ are acted upon by fingers or spurs $e^3$ $e^4$, respectively, on the twist-shaft $e^5$, Fig. 2, so that during the rotation of said shaft the spur $e^3$ will periodically trip lever $E$ to release the shifting-lever $D$.

As has heretofore been stated, the shifting-lever $D$ is loosely mounted on the shaft $d'$, and provision is made to lock said lever against movement when shifted to pulley $b^3$— namely, through the medium of the lever $E$—and to hold said shifting-lever $D$ against accidental displacement in either direction the lever $E'$ is used, the horizontal arm $e^{31}$ of which has at its free or outer end a lug or stud $e^6$, adapted to drop on one or the other side of a stop $d^f$, projecting from the arm $d^4$ on lever $d^3$, fast on the belt-guide shaft $d'$.

In order that the shifting-lever $D$ may be released, the spurs $e^3$ and $e^4$ have such angular relation on the twist-shaft $e^5$ that the lever $E'$ is tripped before the bell-crank lever $D'$ is depressed to shift lever $D$ from pulley $b^4$ to pulley $b^3$, the reverse being the case when said shifting-lever $D$ is returned to its normal position, as will now be described in conjunction with the mechanism for shifting said lever $D$ from fast pulley $b^3$ to pulley $b^2$, fast on sleeve $b$, that carries the larger grooved pulley $b'$.

The belt that drives pulleys $b^3$ and $b^2$ is shifted from pulley $b^3$ to pulley $b^2$ or back again to loose pulley $b^4$ as follows, reference being had to Figs. 7, 8, and 9, as well as to Figs. 1 and 2.

The shifting-lever shaft $d'$ carries at its end opposite to that on which the shifting-lever $D$ is loosely mounted a two-armed lever $A$, Figs. 7 and 8, whose arm $d^g$ is bent, as shown in Fig. 7, and lies in the path of a cam $l$ on a changing-shaft $l'$. (See also Figs. 1 and 2.) The other arm $d^h$ of lever $A$ has a lateral projection $d^i$, that lies in a fork $d^j$ of an angle or L shaped lever $d^k$, free to oscillate on shaft $d'$. To a pin $d^l$, projecting from the vertical arm of lever $d^k$, is connected one end of a spring $d^m$, whose other end is connected adjustably as to tension to a projection $d^n$ from the headstock-framing, Fig. 1. This spring $d^m$, when free to do so, will draw the arm $d^g$ of lever $A$ against the cam $l$ on changing-shaft $l'$. When the latter shaft $l'$ is partly rotated, the cam acts at one movement upon the arm $d^g$ of lever $A$, thereby rocking the shaft $d'$, and consequently the lever $d^k$, against the stress of its spring $d^m$, the lever $d^3$, fast on rock-shaft $d'$, at the same time increasing the tension of its spring $d^5$. When this action of the changing-shaft $l'$ takes place, the angle-lever $E'$, Fig. 2, drops, with the lug or stud $e^6$ on its horizortal arm $e^{31}$ in front of the lug or projection $d^f$ on the arm $d^4$ of lever $d^3$, and holds the latter until released by the spur $e^4$, on the twist-shaft $e^5$, acting on said lever $E'$, as above set forth, to trip the same. When the mule-carriage $y$ reaches the limit of its inward motion, the changing-shaft $l'$ is partially rotated, so that the cam $l$ thereon, acting upon the arm $d^g$ of lever $A$ and therethrough on the shaft $d'$ to rock the same, increases the tension of the springs $d^5$ and $d^m$ through the levers $d^3$ and $d^k$ on shaft $d'$. When this movement of the lever $d^3$ takes place, the shifting-lever $D$ is held in the position shown in Figs. 1 and 2—i. e., in its normal position, with the belt on loose pulley $b^4$—by the lock-notch 4 in the horizontal arm $e^{21}$ of angle-lever E. At the same time, when the mule-carriage $y$ has reached the limit of its inward motion—i. e., when it has arrived at the drawing-rollers—the projection $f^5$ from one of the brackets of the fallers $y^5$ $y^6$ releases the shifting-lever C to allow the spring $e^f$ to shift said lever from pulley $c'$ to pulley $c$, as and for the purposes above explained. As the carriage moves out the bell-crank lever D' is actuated by the finger $y^2$, whereby the shifting-lever D is shifted from the loose pulley $b^4$ to the fast pulley $b^3$, as and for the purposes likewise hereinbefore explained, by which movement of the shifting-lever D the tension of its retracting-spring $d^5$ is still further increased, which tension is then antagonized by the cam $l$ on changing-shaft $l'$ acting on lever A, and by the lug $e^6$ on arm $e^{31}$ of lever E', lying behind the lug or projection $d^f$ on the arm $d^4$ of lever $d^3$.

After a predetermined number of twists the spindles are driven at their highest speed, at which time the spur $e^3$ on twist-shaft $e^5$ disengages lever E from shifting-lever D, and as lever $d^3$ on shaft $d'$ is held against motion the spring $d^5$, acting under increased tension on arm $d^6$ of said lever D, will throw said lever D over from pulley $b^3$ to pulley $b^2$, thereby driving the larger grooved pulley $b'$ and imparting to the spindles their highest speed. Thus the spindles are driven at three successively-increasing speeds during the outward movement of the mule-carriage, and when said carriage has reached the limit of its outward motion and the faller $y^5$ trips the lever G to shift the lever C from pulley $c$ to pulley $c'$ the changing-shaft $l'$ makes its second half of a revolution, thereby moving the cam $l$ out of contact with the arm $d^g$ of lever A, and when the number of twists fixed upon have been given the spur $e^4$ on twist-shaft $e^5$ trips the lever E' out of engagement with the arm $d^4$ of lever $d^3$ on shaft $d'$, leaving the spring $d^m$ to draw upon lever $d^k$, and as this lever is loose on the shaft $d'$, but connected at $d^j$ with lever A, which is fast on said shaft $d'$, the latter is rocked, and therethrough the lever $d^3$, toward the left, so that the spring $d^5$ can act on arm $d^6$ of the shifting-lever D, thereby moving the latter lever from pulley $b^2$ to loose pulley $b^4$, the projection $d^e$ on said lever D moving along the under face of lever E until said projection reaches the notch 4, when said lever E drops and locks the shifting-lever D into position ready to be again shifted to pulley $b^3$, as above described.

Figure 10:
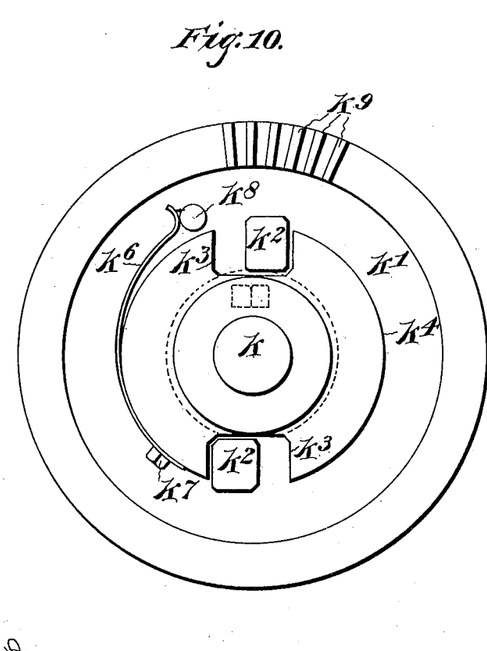
Fig. 10 is a face view of one of the clutch-disks of the clutch mechanism on the back shaft or carriage-drawing-out shaft whereby the drawing-rollers and spindles may be set in motion in advance of the carriage.
Figure 11:
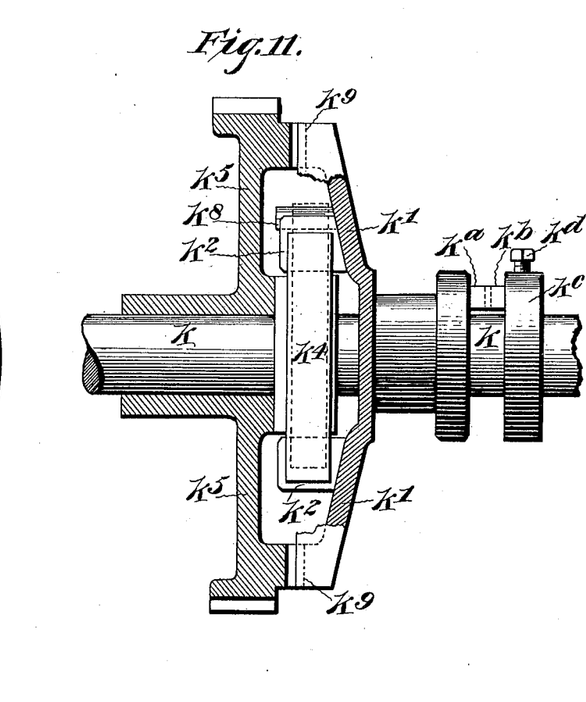
Fig. 11 is a longitudinal sectional view.

In order to start the drawing-rollers and spindles into rotary motion a little in advance of the starting of the carriage $y$ and to such an extent as may be desirable, we employ the following appliances, referring to Figs. 10 and 11: The rollers and drawing-out or back shaft are driven primarily by the same range of wheels, both having sliding clutches actuated simultaneously from the cam-changing shaft in a well-known manner. The sliding clutch-box $k'$ on the drawing-out or back shaft $k$ has two snugs or lugs $k^2$, which take into two recesses or spaces $k^3$ in a disk $k^4$, fast on shaft $k$, and when the sliding clutch-box $k'$ is out of gear with the back-shaft wheel $k^5$ the said lugs $k^2$ are held against or toward the non-driving sides of said spaces $k^3$ in disk $k^4$ by a spring $k^6$, one end of which is secured by a screw $k^7$ to said disk $k^4$, while the other free end has bearing on a stud $k^8$ on the sliding clutch-box $k'$ and acts to rotate said box when out of gear with the back-shaft wheel $k^5$; but when the teeth $k^9$ of box $k'$ move into gear with the back-shaft wheel $k^5$ the lugs $k^2$ move forward through the spaces $k^3$ in disk $k^4$ to the driving sides of said spaces to drive the "drawing-out" motion for the carriage $y$.

The distance traveled over by the lugs $k^2$ before they begin to drive being adjustable, the attendant may at will cause more or less sliver to be delivered from the rollers before the carriage $y$ begins to move out from said rollers. This adjustment is effected as follows: The clutch-box $k'$ is loose on back shaft $k$, and from the hub of said box projects a lug $k^a$ into the path of a similar lug $k^b$ on a collar $k^c$. This collar is adjustable about the back shaft $k$ by means of a set-screw $k^d$, so that by a proper adjustment of said collar the extent of partial rotation of the clutch-box $k'$ on shaft $k$ can be regulated or adjusted relatively to the spaces $k^3$ in disk $k^4$ on said shaft, and consequently the distance the lugs $k^2$ have to travel before they commence driving the wheel $k^5$, and consequently the carriage $y$. The wheel $k^5$ is also loose on the back shaft and is driven by gearing which drives the drawing-out rollers.

Having thus described our invention, what we claim as new therein, and desire to secure by Letters Patent, is—

1. The combination with the rim-shaft of a self-acting mule, three driving-pulleys thereon, and means for driving said pulleys at three different speeds; of coupling devices for coupling the intermediate speed-driving pulley to the shaft, said coupling devices organized to automatically uncouple said pulley when the speed of the shaft is increased from the intermediate to the higher speed, substantially as set forth.

2. The combination with the rim-shaft of a self-acting mule, three driving-pulleys thereon and means for driving said pulleys at three different speeds; of coupling devices for coupling the intermediate speed-driving pulley to said shaft, said coupling devices organized to automatically uncouple said pulley when the speed of the shaft is increased from the intermediate to the higher speed, and a brake operating automatically upon said intermediate speed-pulley to check its momentum as soon as uncoupled from its shaft, substantially as set forth.

3. The combination with the rim-shaft of a self-acting mule, the loose pulley $c$ and the pulley $c'$ thereon, coupling devices adapted to automatically couple said pulley c to said shaft, and mechanism adapted to automatically uncouple said parts, the mule-carriage and faller-shafts thereon; of a brake for pulley c comprising the actuate spring-actuated lever $h$ carrying a brake-shoe $h'$, and actuating mechanism comprising the rod $h^4$ provided with the wedge-piece $h^5$ in contact with the short arm of the lever, and the fingers $h^7$ $h^7$ on said rod, said fingers projecting into the path of the aforesaid faller-shafts, substantially as and for the purpose set forth.

4. The combination with the rim-shaft of a self-acting mule, the spindle-driving pulley $a'$ and belt-pulley $b^3$ fast, and the belt-pulleys $c'$ and $b^2$ loose on said shaft, the belt-pulley $c$ coupled to the shaft by the side of pulley $c'$ and adapted to be uncoupled when the shaft revolves at a speed greater than a given speed, the spindle-driving pulley $b'$ fast on the hub of belt-pulley $b^2$, the belt-pulley $b^4$ loose on the hub of belt-pulley $b^3$ between it and said pulley $b^2$, a driving-shaft carrying two driving-pulleys of different diameter, two driving-belts, the one on the smaller driving-pulley belted to loose pulley $c'$ and the one on the larger driving-pulley to the loose pulley $b^4$, the mule-carriage and twist-shaft; of belt-shifting appliances adapted to be controlled by the movements of said carriage and twist-shaft and organized to first shift the belt from pulley $c'$ onto pulley $c$, then the belt from pulley $b^4$ onto pulley $b^3$ and from the latter across pulley $b^4$ onto pulley $b^2$ during the outward movement of said mule-carriage, for the purpose set forth.

5. The combination with the rim-shaft of a self-acting mule, the spindle-driving pulley $a'$ and belt-pulley $b^3$ fast and the belt-pulleys $c'$ and $b^2$ loose on said shaft, the belt-pulley $c$ coupled to the shaft by the side of pulley $c'$ and adapted to be uncoupled when the shaft revolves at a speed greater than a given speed, the spindle-driving pulley $b'$ fast on the hub of belt-pulley $b^2$ the belt-pulley $b^4$ loose on the hub of belt-pulley $b^3$ between it and said pulley $b^2$, a driving-shaft carrying two driving-pulleys of different diameter, two driving-belts the one on the smaller driving-pulley belted to loose pulley $c'$ and the one on the larger driving-pulley to the loose pulley $b^4$, the mule-carriage and the twist-shaft; of belt-shifting appliances adapted to be controlled by the movements of said carriage and twist-shaft and organized to first shift the belt from pulley $c'$ onto pulley $c$, then the belt from pulley $b^4$ onto pulley $b^3$ and from the latter across pulley $b^4$ onto pulley $b^2$ during the outward movement of said mule-carriage, and mechanism organized and adapted to shift said belts back to their respective loose pulleys when the mule-carriage reaches or is about to reach the limit of its outward motion, for the purposes set forth.

6. The combination with the rim-shaft of a self-acting mule, the spur-wheel $c^6$, twist-worm $b^7$, spindle-driving pulley $a'$ and belt-pulley $b^3$ fast thereon, the belt-pulleys $c'$ and $b^2$ loose on said shaft, the belt-pulley $c$ coupled thereto by the side of pulley $c'$ and adapted to be uncoupled when the shaft revolves at a greater speed than a given speed, the spindle-driving pulley $b'$ fast on the hub of belt-pulley $b^2$, the belt-pulley $b^4$ loose on the hub of the like pulley $b^3$ between it and belt-pulley $b^2$, a driving-shaft carrying two driving-pulleys of different diameters, two driving-belts, the one on the smaller driving-pulley belted to loose pulley $c'$ and the one on the larger pulley belted to loose pulley $b^4$, and the mule-carriage; of belt-shifting mechanism adapted to be controlled by the movements of said carriage and twist-shaft and organized to first shift the belt from pulley $c'$ onto pulley $c$, then the belt from pulley $b^4$ onto pulley $b^3$ and from the latter onto pulley $b^2$ during the outward movement of said carriage, substantially as and for the purposes set forth.

7. The combination with the rim-shaft of a self-acting mule, the spindle-driving pulley $a'$, and the belt-pulley $b^3$ fast thereon, the belt-pulley $b^2$ loose on said shaft, the spindle-driving pulley $b'$ fast on the hub of belt-pulley $b^2$, and the belt-pulley $b^4$ loose on the hub of belt-pulley $b^3$ between it and said belt-pulley $b^2$; of the spring-actuated belt-shifting lever D, the bell-crank lever D' connected with said lever D, the mule-carriage, the finger $y^2$ carried thereby, locking appliances adapted to lock the lever D when shifted from one position to another, and mechanism controlled by a revoluble element of the mule adapted to automatically release the lever D when the finger $y^2$ is about to act upon the bell-crank lever D' to shift the said lever D from pulley $b^4$ to pulley $b^3$, substantially as set forth.

8. The combination with the rim-shaft of a self-acting mule, the spindle-driving pulley $a'$ and the belt-pulley $b^3$ fast thereon, the belt-pulley $b^2$ loose on said shaft, the spindle-driving pulley $b'$ fast on the hub of belt-pulley $b^2$, and the belt-pulley $b^4$ loose on the hub of belt-pulley $b^3$ between it and said belt-pulley $b^2$; of the spring-actuated belt-shifting lever D and the bell-crank lever D' adjustable in the direction of motion of the mule-carriage and adjustably connected with said lever D, the mule-carriage, the finger $y^2$ carried thereby, locking appliances adapted to lock the lever D when shifted from one position to another, a revoluble element of the mule and mechanism controlled thereby and adapted to automatically release the lever D when the finger $y^2$ is about to act upon the bell-crank lever D' to shift the said lever D from pulley $b^4$ to pulley $b^3$, substantially as set forth.

9. The combination with the rim-shaft of a self-acting mule, the belt-pulleys $b^2$ $b^3$ $b^4$, and the spindle-driving pulleys $a'$, $b'$, arranged on said shaft as described, the shaft $d'$, the belt-shifting lever D provided with the arm $d^6$, the rock-lever $d^3$ fast on shaft $d'$ and provided with an arm $d^4$ having lug $d^t$, the spring $d^5$ secured to arms $d^6$ $d^4$ of levers D $d^3$, the locking-lever E having lock-notches 4, 5, adapted to engage a lug on shifting-lever D, the releasing-lever E' provided with a lug $e^6$ adapted to be moved in front or rear of the lug $d^t$ on arm $d^4$ of lever $d^3$, the twist-shaft $e^5$ carrying the cams $e^3$ $e^4$ arranged to operate on levers E, E' respectively, as set forth, and mechanism substantially such as described, controlled by the out movement of the mule-carriage to shift the lever D from pulley $b^4$ to pulley $b^3$; of the lever A loose on shaft $d'$, the spring-actuated rock-lever $d^k$ on said shaft in engagement with one of the arms of lever A, and the change-shaft $l'$ carrying the cam $l$, adapted to operate on the other arm of said lever A under the action of lever $d^k$, substantially as and for the purposes set forth.

10. The combination with the drawing-out or back shaft $k$ of a self-acting mule, and the gear-wheel $k^5$ and disk $k^4$ fast thereon, said disk provided with two recesses $k^3$ diametrically opposite each other, of the sliding toothed clutch-wheel $k'$ on said shaft $k$, provided with snugs $k^2$ projecting into the aforesaid recesses, and the spring $k^6$ secured to disk $k^4$ and acting on a stud $k^8$ on clutch-wheel $k'$, substantially as and for the purpose set forth.

11. The combination with the drawing-out or back shaft $k$ of a self-acting mule, and the gear-wheel $k^5$ and disk $k^4$ fast thereon, said disk provided with two recesses $k^3$ diametrically opposite each other, the sliding toothed clutch-wheel $k'$ on said shaft $k$, provided with snugs $k^2$ projecting into the aforesaid recesses, and the spring $k^6$ secured to disk $k^4$ and acting on a stud $k^8$ on clutch-wheel $k'$; of regulating devices adapted to regulate the distance traveled by the snugs $k^2$ in recesses $k^3$ after the clutch-wheel $k'$ has been moved into engagement with the back-shaft wheel $k^5$ and before said snugs engage the disk $k^4$ to drive said shaft and wheel $k^5$, substantially as and for the purposes set forth.

In testimony that we claim the foregoing as our invention we have signed our names in presence of two subscribing witnesses.

WILLIAM THOMAS WATTS.
WILLIAM STORRS.

Witnesses:
PETER J. LIVSEY,
WILLIAM FAULKNER.

It is hereby certified that in Letters Patent No. 618,259, granted January 24, 1899, upon the application of William Thomas Watts and William Storrs, of Stalybridge, England, for an improvement in "Self-Acting Mules for Spinning Fibrous Materials," an error appears in the printed specification requiring correction, as follows: In line 5, page 6, the word "actuate" should read *arcuate;* and that the said Letters Patent should be read with this correction therein that the same may conform to the record of the case in the Patent Office.

Signed, countersigned, and sealed this 7th day of February, A. D., 1899.

[SEAL.]                                                       WEBSTER DAVIS,
*Assistant Secretary of the Interior.*

Countersigned:
    C. H. DUELL,
        *Commissioner of Patents.*